US012609036B2

(12) United States Patent     (10) Patent No.:   US 12,609,036 B2

Foltan et al.     (45) Date of Patent:   Apr. 21, 2026

(54) METHODS AND SYSTEMS FOR PROVIDING CONDITIONAL ESTIMATED ARRIVAL TIMES

(71) Applicant: HONEYWELL INTERNATIONAL INC., Charlotte, NC (US)

(72) Inventors: Stanislav Foltan, Brno (CZ); Marek Batelka, Brno (CZ); Rajesh Chaubey, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 177 days.

(21) Appl. No.: 18/509,645

(22) Filed: Nov. 15, 2023

(65) Prior Publication Data

US 2025/0104566 A1     Mar. 27, 2025

(30) Foreign Application Priority Data

Sep. 26, 2023    (IN)  .............................. 202311064533

(51) Int. Cl.
   *G08G 5/26*      (2025.01)
   *B64D 43/00*     (2006.01)
   *G08G 5/34*      (2025.01)

(52) U.S. Cl.
   CPC ............... *G08G 5/26* (2025.01); *B64D 43/00* (2013.01); *G08G 5/34* (2025.01)

(58) Field of Classification Search
None
See application file for complete search history.

(56) References Cited

U.S. PATENT DOCUMENTS

| | | | |
|---|---|---|---|
| 9,355,566 B2 | 5/2016 | Garrido-Lopez et al. | |
| 11,270,593 B2 | 3/2022 | Molnar et al. | |
| 2010/0241345 A1* | 9/2010 | Cornell .................... | G08G 5/30 |
| | | | 701/120 |
| 2012/0179368 A1* | 7/2012 | Walter ................... | G01C 21/20 |
| | | | 701/465 |
| 2021/0350711 A1 | 11/2021 | Perikala et al. | |
| 2022/0301439 A1* | 9/2022 | Kulesh ..................... | G08G 5/34 |
| 2022/0309933 A1 | 9/2022 | Pastre et al. | |
| 2023/0169876 A1* | 6/2023 | Narasimhulu .......... | G08G 5/80 |
| | | | 701/120 |

FOREIGN PATENT DOCUMENTS

| | | |
|---|---|---|
| EP | 1583937 B1 | 6/2007 |
| EP | 2455928 B1 | 10/2018 |
| EP | 2474812 B1 | 10/2018 |
| GB | 2589302 A | 6/2021 |

* cited by examiner

*Primary Examiner* — Madison R. Inserra

(74) *Attorney, Agent, or Firm* — Ingrassia Fisher & Lorenz LLP

(57)      ABSTRACT

Aircraft systems and methods are provided for assisting sequencing of aircraft by providing conditional estimated arrival times for short arrivals or early clearances. One method involves identifying a geographic location associated with a merge point for an approach to an airport associated with a flight plan for an aircraft, determining an alternative lateral trajectory for the aircraft from a second geographic location along a sequencing route between arrival and the merge point, determining a conditional estimated arrival time for the aircraft at the merge point based at least in part on the alternative lateral trajectory, and transmitting a message including the conditional estimated arrival time for the aircraft to an external computing system.

19 Claims, 3 Drawing Sheets

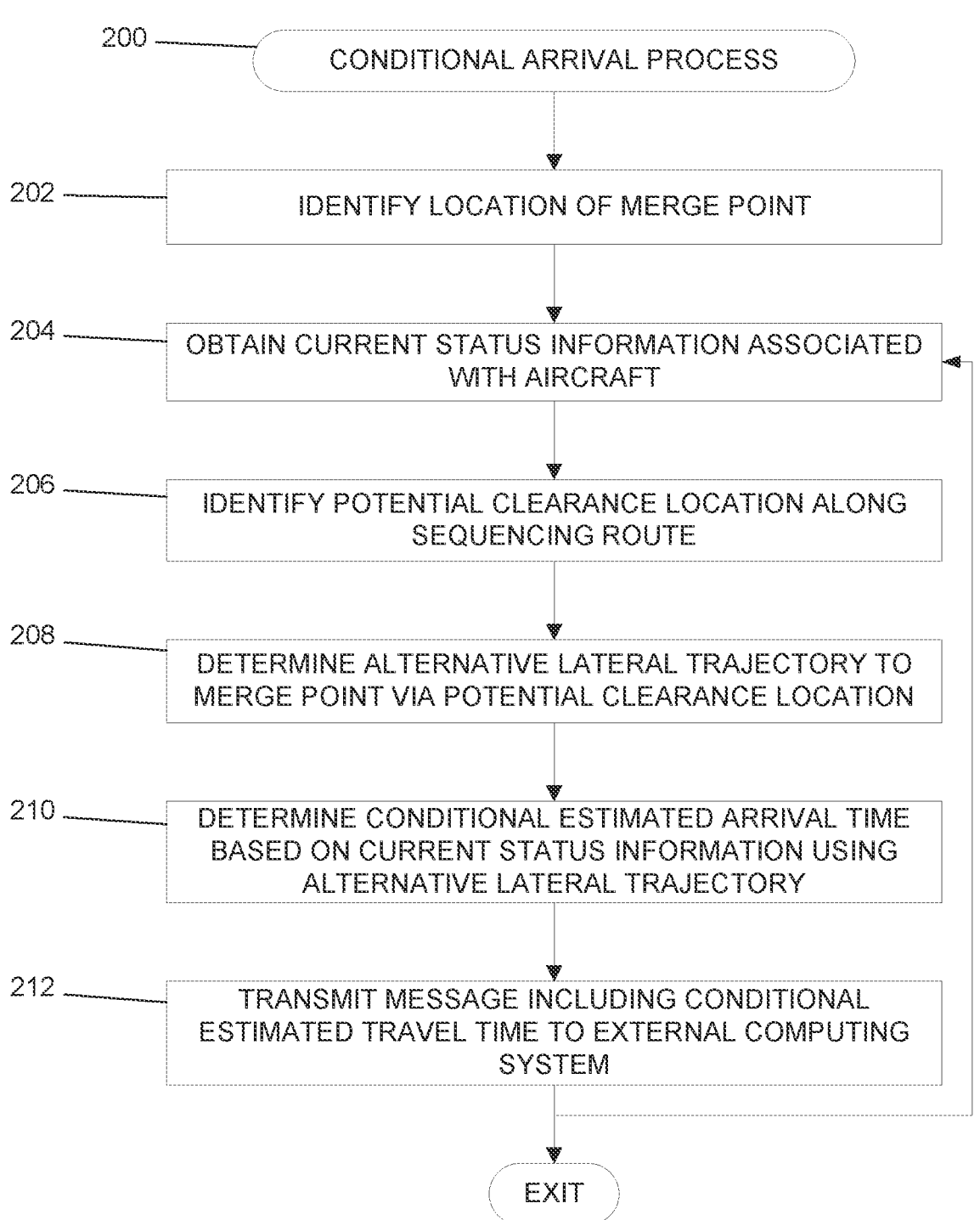

200 — CONDITIONAL ARRIVAL PROCESS

202 — IDENTIFY LOCATION OF MERGE POINT

204 — OBTAIN CURRENT STATUS INFORMATION ASSOCIATED WITH AIRCRAFT

206 — IDENTIFY POTENTIAL CLEARANCE LOCATION ALONG SEQUENCING ROUTE

208 — DETERMINE ALTERNATIVE LATERAL TRAJECTORY TO MERGE POINT VIA POTENTIAL CLEARANCE LOCATION

210 — DETERMINE CONDITIONAL ESTIMATED ARRIVAL TIME BASED ON CURRENT STATUS INFORMATION USING ALTERNATIVE LATERAL TRAJECTORY

212 — TRANSMIT MESSAGE INCLUDING CONDITIONAL ESTIMATED TRAVEL TIME TO EXTERNAL COMPUTING SYSTEM

EXIT

FIG. 2

METHODS AND SYSTEMS FOR PROVIDING CONDITIONAL ESTIMATED ARRIVAL TIMES

CROSS REFERENCE TO RELATED APPLICATION

This application claims priority to India Provisional Patent Application No. 202311064533, filed Sep. 26, 2023, the entire content of which is incorporated by reference herein.

TECHNICAL FIELD

The subject matter described herein relates generally to vehicle systems, and more particularly, embodiments of the subject matter relate to aircraft systems and related displays for providing conditional estimated arrival times for alternative trajectories.

BACKGROUND

Aircraft are typically operated in accordance with predefined routes or procedures, particularly in the vicinity of an airport or within other congested airspaces. Air traffic control (ATC) is typically responsible for managing traffic flow using these predefined routes or procedures and instructing aircraft to deviate from a particular route or procedure to achieve desired separation distances, aircraft sequencing, resolve potential conflicts between aircraft, and/ or the like. For example, the ATC may instruct an aircraft to execute a holding procedure or otherwise fly a holding pattern to delay a particular aircraft. As another example, radar vectoring may be utilized by ATC for separation, safety, or other reasons. Due to the increased ATC workload associated with radar vectoring and the undesirable fuel burn associated with holding, point merge procedures have been developed that include navigational legs that inbound aircraft fly prior to receiving a clearance from ATC to achieve the desired sequencing without reliance on radar vectoring or holding patterns. However, both pilots and ATC may lack situational awareness with respect to the potential options or ranges of times for arrival while flying (or prior to flying) a sequencing leg of a point merge procedure. Accordingly, it is desirable to improve situational awareness and reduce workload for ATC and pilots in connection with executing a point merge procedure. Other desirable features and characteristics will become apparent from the subsequent detailed description and the appended claims, taken in conjunction with the accompanying drawings and this background.

BRIEF SUMMARY

Systems and methods are provided for sequencing aircraft or other vehicles en route to a destination. One exemplary method involves identifying a first geographic location associated with a merge point for an approach to an airport associated with a flight plan for an aircraft, where the flight plan includes a sequencing route between arrival and the merge point, determining, by a computing system onboard the aircraft, an alternative lateral trajectory for the aircraft from a second geographic location along the sequencing route to the merge point, determining, by the computing system, a conditional estimated arrival time for the aircraft at the merge point based at least in part on the alternative lateral trajectory, and transmitting, by the computing system, a message including the conditional estimated arrival time for the aircraft to an external computing system.

An apparatus for a computer-readable medium is also provided. The computer-readable medium has computer-executable instructions stored thereon that, when executed by a processing system, are configurable to cause the processing system to identify a first geographic location associated with a merge point for an approach to an airport associated with a flight plan for an aircraft that includes a sequencing route between arrival and the merge point, determine an alternative lateral trajectory for the aircraft from a second geographic location along the sequencing route to the merge point, determine a conditional estimated arrival time for the aircraft at the merge point based at least in part on the alternative lateral trajectory, and transmit a message including the conditional estimated arrival time for the aircraft to an external computing system.

A system is also provided that includes a monitoring computing system associated with an air traffic controller (ATC) external to an aircraft, a flight management system (FMS) to maintain a flight plan that includes a sequencing route between arrival and a merge point, and a processing system coupled to the FMS to provide a projected profile broadcasting service that is configurable to identify a first geographic location associated with the merge point for an approach to an airport associated with the flight plan for the aircraft, determine an alternative lateral trajectory for the aircraft from a second geographic location along the sequencing route to the merge point, determine a conditional estimated arrival time for the aircraft at the merge point based at least in part on the alternative lateral trajectory, and transmit a message including the conditional estimated arrival time for the aircraft to the monitoring computing system over a network.

This summary is provided to describe select concepts in a simplified form that are further described in the Detailed Description. This summary is not intended to identify key or essential features of the claimed subject matter, nor is it intended to be used as an aid in determining the scope of the claimed subject matter.

BRIEF DESCRIPTION OF DRAWINGS

Exemplary embodiments of the subject matter of the present disclosure will hereinafter be described in conjunction with the following drawing figures, wherein like numerals denote like elements, and wherein:

FIG. 2 is a flow diagram of a conditional arrival process suitable for implementation in connection with the aircraft system of FIG. 1 in one or more exemplary embodiments.

DETAILED DESCRIPTION

Figure 1:
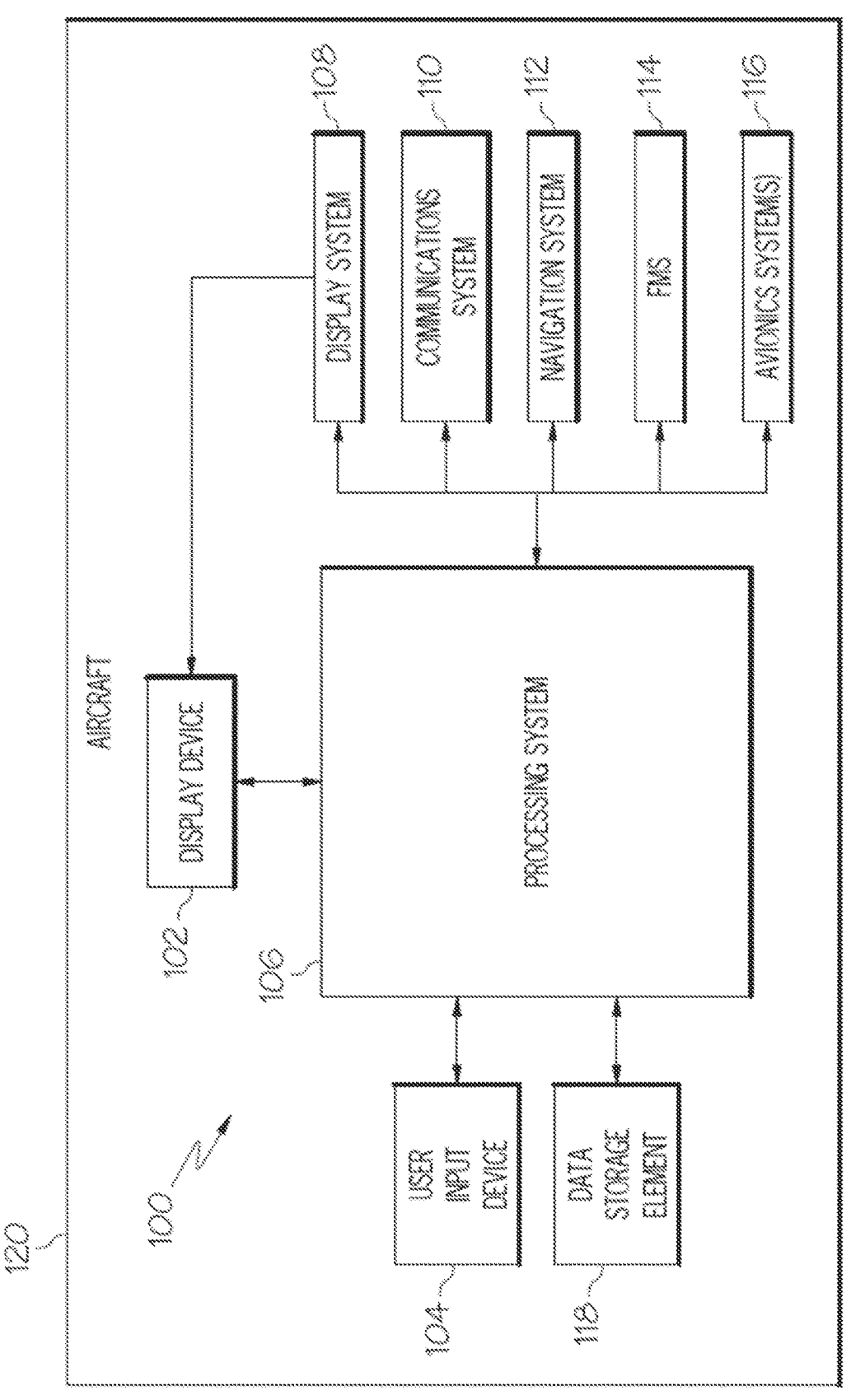
FIG. 1 is a block diagram of a system for an aircraft in accordance with one or more exemplary embodiments.

The following detailed description is merely exemplary in nature and is not intended to limit the subject matter of the application and uses thereof. Furthermore, there is no intention to be bound by any expressed or implied theory presented in the preceding technical field, background, brief summary, or the following detailed description.

Embodiments of the subject matter described herein relate to systems and methods for providing indicia of conditional estimated arrival times to improve situational awareness of pilots and air traffic control (ATC) with respect to sequencing and potential arrival times for an aircraft flying (or planning to fly) a point merge procedure en route to an airport. In this regard, the point merge procedure is a procedural phase of a flight plan that is to be flown by the aircraft as part of the descent flight phase after an arrival route phase prior to an approach flight phase. For example, the initial navigational reference point of the point merge procedure may be realized as the final navigational reference point for an arrival route procedure defined for an airport. The point merge procedure generally includes one or more route segments (or sequencing legs) that provide a lateral trajectory for a sequencing route to be flown after the arrival route prior to receiving clearance from ATC to proceed en route direct to the merge point associated with the desired runway at the destination airport. In this regard, the merge point may be realized as an initial approach fix for an approach procedure associated with the desired runway. In some implementations, the navigational reference points that define the respective legs of the sequencing route are equidistant from the merge point. For purposes of explanation, the subject matter is described herein primarily in the context of a point merge procedure including sequencing legs that define a substantially arcuate, semicircular or C-shaped lateral trajectory for a sequencing route to be flown; however, it should be appreciated that the subject matter described herein is not limited to any particular shape or configuration of the sequencing route and may be implemented in an equivalent manner for so-called trombone procedures or other sequencing route lateral trajectory shapes and configurations.

As described in greater detail below, in exemplary implementations, an alternative lateral trajectory is constructed or otherwise determined from a geographic location along the sequencing route to the merge point, and then utilized to calculate or otherwise determine an estimated arrival time for the aircraft at the merge point. In this regard, the estimated arrival time associated with the alternative lateral trajectory functions as a conditional estimated arrival time for which the aircraft could feasibly achieve at the merge point if the ATC were to clear the aircraft direct to the merge point from that particular geographic location along the sequencing route. In this regard, it should be noted that in concert with constructing an alternative lateral trajectory, a corresponding vertical trajectory for the vertical path of the aircraft may be concurrently constructed from the current altitude of the aircraft such that the aircraft satisfies any applicable altitude constraints, speed constraints and/or the like upon arrival at the merge point, such that the conditional estimated arrival time reflects the both the alternative lateral trajectory and the corresponding vertical trajectory that the alternative lateral trajectory entails.

Depending on the implementation, the geographic location utilized to construct the alternative lateral trajectory may be realized as the current geographic location of the aircraft or the geographic location associated with the next down path navigational reference point along the sequencing route in advance of the current aircraft location. The conditional estimated arrival time may be transmitted, broadcasted or otherwise provided by the aircraft, for example, as part of a broadcast message that includes the conditional estimated arrival time in addition to the planned estimated arrival time for the aircraft assuming the entirety of the sequencing route is flown. For example, the conditional estimated arrival time may be appended to or otherwise included with an Automatic Dependent Surveillance-Contract (ADS-C) broadcast message including the extended projected profile (EPP) for the aircraft via a controller-pilot data link communications (CPDLC) system, an Aircraft Communications Addressing and Reporting System (ACARS), or another suitable avionics system onboard the aircraft. In this regard, an external computing system associated with ATC or another ground station may receive and analyze the conditional estimated arrival time calculated for the aircraft in relation to the EPP and the planned arrival time for the merge point when making a determination of whether and when to clear the aircraft to proceed to the merge point.

FIG. 1 depicts an exemplary embodiment of an aircraft system 100 which may be utilized with an aircraft 120. In an exemplary embodiment, the system 100 includes, without limitation, a display device 102, one or more user input devices 104, a processing system 106, a display system 108, a communications system 110, a navigation system 112, a flight management system (FMS) 114, one or more avionics systems 116, and a data storage element 118 suitably configured to support operation of the system 100, as described in greater detail below.

In exemplary embodiments, the display device 102 is realized as an electronic display capable of graphically displaying flight information or other data associated with operation of the aircraft 120 under control of the display system 108 and/or processing system 106. In this regard, the display device 102 is coupled to the display system 108 and the processing system 106, and the processing system 106 and the display system 108 are cooperatively configured to display, render, or otherwise convey one or more graphical representations or images associated with operation of the aircraft 120 on the display device 102. The user input device 104 is coupled to the processing system 106, and the user input device 104 and the processing system 106 are cooperatively configured to allow a user (e.g., a pilot, co-pilot, or crew member) to interact with the display device 102 and/or other elements of the system 100, as described in greater detail below. Depending on the embodiment, the user input device(s) 104 may be realized as a keypad, touchpad, keyboard, mouse, touch panel (or touchscreen), joystick, knob, line select key or another suitable device adapted to receive input from a user. In some exemplary embodiments, the user input device 104 includes or is realized as an audio input device, such as a microphone, audio transducer, audio sensor, or the like, that is adapted to allow a user to provide audio input to the system 100 in a "hands free" manner using speech recognition.

The processing system 106 generally represents the hardware, software, and/or firmware components configured to facilitate communications and/or interaction between the elements of the system 100 and perform additional tasks and/or functions to support operation of the system 100, as described in greater detail below. Depending on the embodiment, the processing system 106 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 106 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 106 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 106, or in any practical combination thereof. For example, in one or more embodiments, the processing system 106 includes or otherwise accesses a data storage element (or memory), which may be realized as any sort of non-transitory short or long term storage media capable of storing programming instructions for execution by the processing system 106. The code or other computer-executable programming instructions, when read and executed by the processing system 106, cause the processing system 106 to support or otherwise perform certain tasks, operations, functions, and/or processes described herein.

The display system 108 generally represents the hardware, software, and/or firmware components configured to control the display and/or rendering of one or more navigational maps and/or other displays pertaining to operation of the aircraft 120 and/or onboard systems 110, 112, 114, 116 on the display device 102. In this regard, the display system 108 may access or include one or more databases suitably configured to support operations of the display system 108, such as, for example, a terrain database, an obstacle database, a navigational database, a geopolitical database, an airport database, a terminal airspace database, a special use airspace database, or other information for rendering and/or displaying navigational maps and/or other content on the display device 102.

In the illustrated embodiment, the aircraft system 100 includes a data storage element 118, which is capable of storing, maintaining or otherwise implementing one or more of the databases that support operations of the aircraft system 100 described herein. In some embodiments, the data storage element 118 contains aircraft procedure information (or instrument procedure information) for a plurality of airports and maintains association between the aircraft procedure information and the corresponding airports. Depending on the embodiment, the data storage element 118 may be physically realized using RAM memory, ROM memory, flash memory, registers, a hard disk, or another suitable data storage medium known in the art or any suitable combination thereof. As used herein, aircraft procedure information should be understood as a set of operating parameters, constraints, or instructions associated with a particular aircraft action (e.g., approach, departure, arrival, climbing, and the like) that may be undertaken by the aircraft 120 at or in the vicinity of a particular airport. An airport should be understood as referring to any sort of location suitable for landing (or arrival) and/or takeoff (or departure) of an aircraft, such as, for example, airports, runways, landing strips, and other suitable landing and/or departure locations, and an aircraft action should be understood as referring to an approach (or landing), an arrival, a departure (or takeoff), an ascent, taxiing, or another aircraft action having associated aircraft procedure information. An airport may have one or more predefined aircraft procedures associated therewith, wherein the aircraft procedure information for each aircraft procedure at each respective airport are maintained by the data storage element 118 in association with one another.

Depending on the embodiment, the aircraft procedure information may be provided by or otherwise obtained from a governmental or regulatory organization, such as, for example, the Federal Aviation Administration in the United States. In an exemplary embodiment, the aircraft procedure information includes instrument procedure information, such as instrument approach procedures, standard terminal arrival routes, instrument departure procedures, standard instrument departure routes, obstacle departure procedures, or the like, traditionally displayed on a published charts, such as Instrument Approach Procedure (IAP) charts, Standard Terminal Arrival (STAR) charts or Terminal Arrival Area (TAA) charts, Standard Instrument Departure (SID) routes, Departure Procedures (DP), terminal procedures, approach plates, and the like. In exemplary embodiments, the data storage element 118 maintains associations between prescribed operating parameters, constraints, and the like and respective navigational reference points (e.g., waypoints, positional fixes, radio ground stations (VORs, VORTACs, TACANs, and the like), distance measuring equipment, non-directional beacons, or the like) defining the aircraft procedure, such as, for example, altitude minima or maxima, minimum and/or maximum speed constraints, RTA constraints, and the like.

In exemplary embodiments described herein, the aircraft procedure information maintained by the data storage element 118 includes point merge procedures for one or more airports, where the point merge procedure defines an arcuate trajectory to be flown between an arrival procedure (e.g., a standard terminal arrival route) and an approach procedure (e.g., an instrument approach procedure, or the like). That said, although the subject matter may be described in the context of a point merge procedure for purpose of explanation, the subject matter is not necessarily limited to any particular type, combination or sequence of aircraft procedures and may be implemented for other aircraft procedures (e.g., a trombone arrival) in an equivalent manner.

Still referring to FIG. 1, in exemplary embodiments, the processing system 106 is coupled to the navigation system 112, which is configured to provide real-time navigational data and/or information regarding operation of the aircraft 120. The navigation system 112 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 112, as will be appreciated in the art. The navigation system 112 is capable of obtaining and/or determining the instantaneous position of the aircraft 120, that is, the current (or instantaneous) location of the aircraft 120 (e.g., the current latitude and longitude) and the current (or instantaneous) altitude or above ground level for the aircraft 120. The navigation system 112 is also capable of obtaining or otherwise determining the heading of the aircraft 120 (i.e., the direction the aircraft is traveling in relative to some reference). In the illustrated embodiment, the processing system 106 is also coupled to the communications system 110, which is configured to support communications to and/or from the aircraft 120. For example, the communications system 110 may support communications between the aircraft 120 and air traffic control or another suitable command center or ground location. In this regard, the communications system 110 may be realized using a radio communication system and/or another suitable data link system. In this regard, various embodiments of the communications system 110 hardware and/or other components configured to support data link communications to/from the aircraft 120 using a data link infrastructure and/or a data link service provider.

In exemplary embodiments, the processing system 106 is also coupled to the FMS 114, which is coupled to the navigation system 112, the communications system 110, and one or more additional avionics systems 116 to support navigation, flight planning, and other aircraft control functions in a conventional manner, as well as to provide real-time data and/or information regarding the operational status of the aircraft 120 to the processing system 106. Although FIG. 1 depicts a single avionics system 116, in practice, the system 100 and/or aircraft 120 will likely include numerous avionics systems for obtaining and/or providing real-time flight-related information that may be displayed on the display device 102 or otherwise provided to a user (e.g., a pilot, a co-pilot, or crew member). For example, practical embodiments of the system 100 and/or aircraft 120 will likely include one or more of the following avionics systems suitably configured to support operation of the aircraft 120: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

It should be understood that FIG. 1 is a simplified representation of the system 100 for purposes of explanation and case of description, and FIG. 1 is not intended to limit the application or scope of the subject matter described herein in any way. It should be appreciated that although FIG. 1 shows the display device 102, the user input device 104, and the processing system 106 as being located onboard the aircraft 120 (e.g., in the cockpit), in practice, one or more of the display device 102, the user input device 104, and/or the processing system 106 may be located outside the aircraft 120 (e.g., on the ground as part of an air traffic control center or another command center) and communicatively coupled to the remaining elements of the system 100 (e.g., via a data link and/or communications system 110). Similarly, in some embodiments, the data storage element 118 may be located outside the aircraft 120 and communicatively coupled to the processing system 106 via a data link and/or communications system 110. Furthermore, practical embodiments of the system 100 and/or aircraft 120 will include numerous other devices and components for providing additional functions and features, as will be appreciated in the art. In this regard, it will be appreciated that although FIG. 1 shows a single display device 102, in practice, additional display devices may be present onboard the aircraft 120. Additionally, it should be noted that in other embodiments, features and/or functionality of processing system 106 described herein can be implemented by or otherwise integrated with the features and/or functionality provided by the FMS 114. In other words, some embodiments may integrate the processing system 106 with the FMS 114. In yet other embodiments, various aspects of the subject matter described herein may be implemented by or at an electronic flight bag (EFB) or similar electronic device that is communicatively coupled to the processing system 106 and/or the FMS 114.

In exemplary implementations, the communications system 110 includes or is otherwise realized as a CPDLC system, an ACARS system, or another system suitable for broadcasting or otherwise transmitting ADS-C broadcast messages from the aircraft 120 to a monitoring system at a ground operations center over a communications network, such as the Internet, a satellite network, a cellular network, or the like. The ground operations center may be realized as a control tower or other facility located on the ground that includes one or more monitoring systems equipped to track, analyze, and otherwise monitor operations of one or more aircraft 120. In this regard, the monitoring system may include a computer or other computing system at the ground operations center that may be operated by ground personnel, such as a flight dispatcher or air traffic controller, to monitor and track the flight of the aircraft 120. Accordingly, a monitoring system may generally include a user input device, a display device, a communications system, a processing system, and a data storage element suitably configured to support the subject matter described herein. In exemplary embodiments, the display device is realized as an electronic display that is capable of graphically displaying a flight tracking display or other imagery that includes information or other data associated with operation of the aircraft 120, as described in greater detail below. The user input device is coupled to the processing system, and the user input device and the processing system are cooperatively configured to allow ground personnel monitoring aircraft 120 to interact with the flight tracking station to analyze flight tracking data contained in the ADS-C broadcast messages and communicate clearances or instructions to the aircraft 120, as described in greater detail below.

FIG. 2 depicts an exemplary embodiment of a conditional arrival process 200 suitable for implementation by the aircraft system 100 to provide situational awareness to ATC or other ground personnel of different potential arrival times for a particular aircraft. The various tasks performed in connection with the illustrated process may be implemented using hardware, firmware, software executed by processing circuitry, or any combination thereof. For illustrative purposes, the following description may refer to elements mentioned above in connection with FIG. 1. In practice, portions of the conditional arrival process 200 may be performed by different elements of a vehicle system. That said, exemplary embodiments are described herein in the context of the conditional arrival process 200 being primarily performed by a projected profile broadcasting service at a processing system 106. It should be appreciated that the conditional arrival process 200 may include any number of additional or alternative tasks, the tasks need not be performed in the illustrated order and/or the tasks may be performed concurrently, and/or conditional arrival process 200 may be incorporated into a more comprehensive procedure or process having additional functionality not described in detail herein. Moreover, one or more of the tasks shown and described in the context of FIG. 2 could be omitted from a practical embodiment of the conditional arrival process 200 as long as the intended overall functionality remains intact.

Referring to FIG. 2 with continued reference to FIG. 1, the conditional arrival process 200 initializes or otherwise begins by identifying or otherwise obtaining the geographic location of a merge point associated with the destination runway for the current flight plan of the aircraft (task 202). In this regard, the projected profile broadcasting service at the processing system 106 analyzes the current flight plan for the aircraft to identify the name or other identifying information associated with the waypoint or other navigational reference point that functions as the merge point for a point merge procedure specified or otherwise contained within the current flight plan. The name or other identifier may be utilized by the projected profile broadcasting service at the processing system 106 to query an airport database, a procedure database or another navigational database to obtain latitude and longitude coordinates or other information identifying the geographic location associated with that waypoint that functions as the merge point for the point merge procedure. It should be noted that the projected profile broadcasting service may also obtain other information associated with the merge point that may be utilized to construct lateral and/or vertical trajectories en route to the merge point, including, but not limited to, minimum and/or maximum speed constraints, minimum and/or maximum altitude constraints, and/or the like.

The conditional arrival process 200 continues by obtaining current status information associated with the aircraft indicative of the current state of the aircraft and identifies or otherwise determines a potential clearance location along the sequencing route of the point merge procedure associated with the flight plan (tasks 204, 206). In this regard, the projected profile broadcasting service at the processing system 106 may receive or otherwise obtain, from the FMS 114 or other onboard systems 110, 112, 116, status information identifying the current geographic location of the aircraft 120, the current altitude of the aircraft 120, the current flight phase for the aircraft 120, the current speed of the aircraft 120, the current heading of the aircraft 120 and/or the like. Based on the current location or state of the aircraft 120, the projected profile broadcasting service at the processing system 106 identifies or otherwise determines the next (or nearest) potential location along the sequencing route of the planned point merge procedure ahead of the current location of the aircraft where the aircraft 120 could potentially be cleared for proceeding direct to the merge point by ATC. In this regard, when the aircraft 120 is still flying an arrival procedure or has otherwise yet to reach the initial waypoint of the sequencing route, the projected profile broadcasting service may identify the initial waypoint of the sequencing route as the next down path geographic location where the aircraft 120 could potentially be cleared to proceed direct en route to the merge point. In other situations, when the aircraft 120 has already reached the initial waypoint of the sequencing route and is currently flying along the arcuate lateral trajectory of the sequencing route, the projected profile broadcasting service may identify the next waypoint of the sequencing route that is down path from the current aircraft location (e.g., the waypoint that defines the end of the current sequencing leg and the start of the next sequencing leg) as the next geographic location where the aircraft 120 could potentially be cleared to proceed direct en route to the merge point. That said, in other implementations, the projected profile broadcasting service may identify the current aircraft location as the next geographic location where the aircraft 120 could potentially be cleared to proceed direct en route to the merge point (e.g., if the ATC were to clear the aircraft 120 immediately).

After identifying the next potential clearance location along the sequencing route, the conditional arrival process 200 constructs or otherwise determines an alternative lateral trajectory en route to the merge point via the potential clearance location that is different from the planned lateral trajectory to the merge point, and then calculates or otherwise determines a conditional estimated arrival time for the merge point based on the current status information using the alternative lateral trajectory in lieu of the planned lateral trajectory to the merge point (tasks 208, 210). In this regard, the projected profile broadcasting service constructs a lateral trajectory (and corresponding vertical trajectory) from the potential clearance location that may include or otherwise incorporate one or more turn segments that account for the turning radius of the aircraft 120 given the current or anticipated speed, heading, configuration and/or the like for the aircraft 120 upon reaching the potential clearance location to align the aircraft heading with the merge point prior to a direct segment en route to the merge point, which, in turn may be followed by one or more turn segments to align the heading of the aircraft 120 with the runway, glideslope or other approach trajectory upon reaching the merge point.

After constructing the alternative lateral trajectory, the projected profile broadcasting service utilizes the current geographic location of the aircraft 120, the current heading of the aircraft 120, the current speed of the aircraft 120, the current altitude of the aircraft 120, and potentially other current state information of the aircraft 120 to calculate or otherwise determine an estimated amount of time required for the aircraft 120 to reach the potential clearance location for the alternative lateral trajectory in accordance with the current flight plan. Thereafter, based on the planned or anticipated speed, altitude, heading and/or other anticipated status information for the aircraft 120 upon reaching the potential clearance location, the projected profile broadcasting service calculates or otherwise determines an estimated amount of time required for the aircraft 120 to travel along the alternative lateral trajectory and corresponding vertical trajectory to arrive at the merge point in a manner that satisfies any applicable altitude, speed, or other constraints associated with the merge point. The conditional estimated arrival time for the merge point may then be determined by adding or otherwise combining the estimated amount of travel time required to reach the potential clearance location with the estimated amount of travel time required to reach the merge point from the potential clearance location along the alternative lateral trajectory, and then adding the cumulative estimated amount of travel time to the current time to arrive at a conditional estimated time of arrival (ETA) for the merge point in accordance with the alternative lateral trajectory in the event the ATC were to issue a clearance to the aircraft 120 prior to reaching the potential clearance location.

After determining the conditional ETA, the conditional arrival process 200 transmits or otherwise provides a message including the conditional ETA to an external computing system (task 212). For example, in some implementations, the projected profile broadcasting service appends or otherwise incorporates the conditional estimated arrival time to an ADS-C EPP broadcast message that includes a route prediction and corresponding future trajectory information determined by the FMS 114, including, for example, planned, predicted or otherwise anticipated horizontal and/or vertical speeds, altitudes, aircraft weight, fuel remaining, and/or the like for future waypoints along the planned route corresponding to the current flight plan. That said, in other implementations, the projected profile broadcasting service may generate a separate standalone broadcast message that includes the conditional estimated arrival time. In addition to providing the conditional estimated arrival time, the projected profile broadcasting service may also transmit or otherwise provide indicia of the clearance location along the sequencing route associated with the conditional estimated arrival time and/or an estimated time of arrival associated with the aircraft 120 reaching that clearance location, to provide situational awareness to the ATC, pilot or other users of the amount of time remaining before when the aircraft 120 would need to be cleared to achieve the conditional estimated arrival time.

In exemplary implementations, the message broadcast by the projected profile broadcasting service at the processing system 106 is received or otherwise obtained by a monitoring system or other external computing system at a ground operations center that is utilized by ATC to issue clearances to aircraft en route to the particular destination airport associated with the current flight plan of the ownship aircraft 120 or otherwise manage the airspace encompassing that destination airport and/or the sequencing route. In response to receiving a message including a conditional estimated arrival time for an aircraft, the external computing system may generate or otherwise provide a graphical representation of the conditional estimated arrival time and graphical indicia of the aircraft associated with that conditional estimated arrival time to facilitate the ATC making a determination of whether and when to issue a clearance with respect to that aircraft. In this regard, ATC may analyze the conditional estimated arrival time associated with the aircraft 120 along with the planned arrival time for the aircraft 120 according to the flight plan (which may be contained in or derived from the EPP broadcast message) in relation to estimated arrival times for other aircraft to issue clearances with greater situational awareness with respect to the range of potential arrival times for the aircraft 120, potentially resulting in an earlier clearance for the aircraft 120.

In addition to transmitting the conditional estimated arrival time to the ATC or other external computing system, in some implementations, the projected profile broadcasting service may also generate or otherwise provide a graphical representation of the conditional estimated arrival time and/or graphical indication of the potential clearance location to provide improved situational awareness to the pilot of the aircraft 120 and facilitate negotiation of an earlier clearance with ATC. In this regard, proceeding direct to the merge point may reduce fuel consumption and improve passenger experience by reducing travel time, and accordingly, the pilot of the ownship aircraft 120 may utilize the conditional estimated arrival time to negotiate with the ATC to achieve clearance prior to traversing the potential clearance location, thereby improving operational efficiency. In various implementations, the projected profile broadcasting service may generate or otherwise provide a graphical representation of the alternative lateral trajectory on a navigational map on a display device 102 to provide improved situational awareness of the current location of the aircraft 120 in relation to the potential clearance location and alternative lateral trajectory relative to the sequencing route and the planned lateral trajectory.

In exemplary implementations, the loop defined by tasks 204, 206, 208, 210 and 212 may repeat while the aircraft 120 is en route to the destination airport to obtain updated or more recent status information associated with the aircraft 120 to dynamically update the potential clearance location and conditional estimated arrival time as the aircraft 120 travels to reflect the current state of the aircraft 120. In this regard, once the aircraft 120 traverses the potential clearance location associated with the alternative lateral trajectory, the projected profile broadcasting service may dynamically update the conditional estimated arrival time by identifying an updated potential clearance location along the sequencing route. For example, the projected profile broadcasting service may identify the next waypoint of the sequencing route that is down path from the waypoint that was previously identified as the potential clearance location (e.g., task 206), and then construct an updated lateral trajectory (and correspondingly updated vertical trajectory) from the updated potential clearance location to the merge point in a similar manner as described above (e.g., task 208). After constructing an updated alternative lateral trajectory that reflects the current state of the aircraft, the projected profile broadcasting service dynamically updates the conditional estimated arrival time in accordance with the updated alternative lateral trajectory and broadcasts that conditional estimated arrival time to one or more external systems in a similar manner as described above (e.g., tasks 210, 212). In this manner, the ATC and pilot may be continually provided with the most up-to-date estimate of the conditional arrival time and potential clearance location associated therewith as the aircraft 120 travels.

Figure 3:
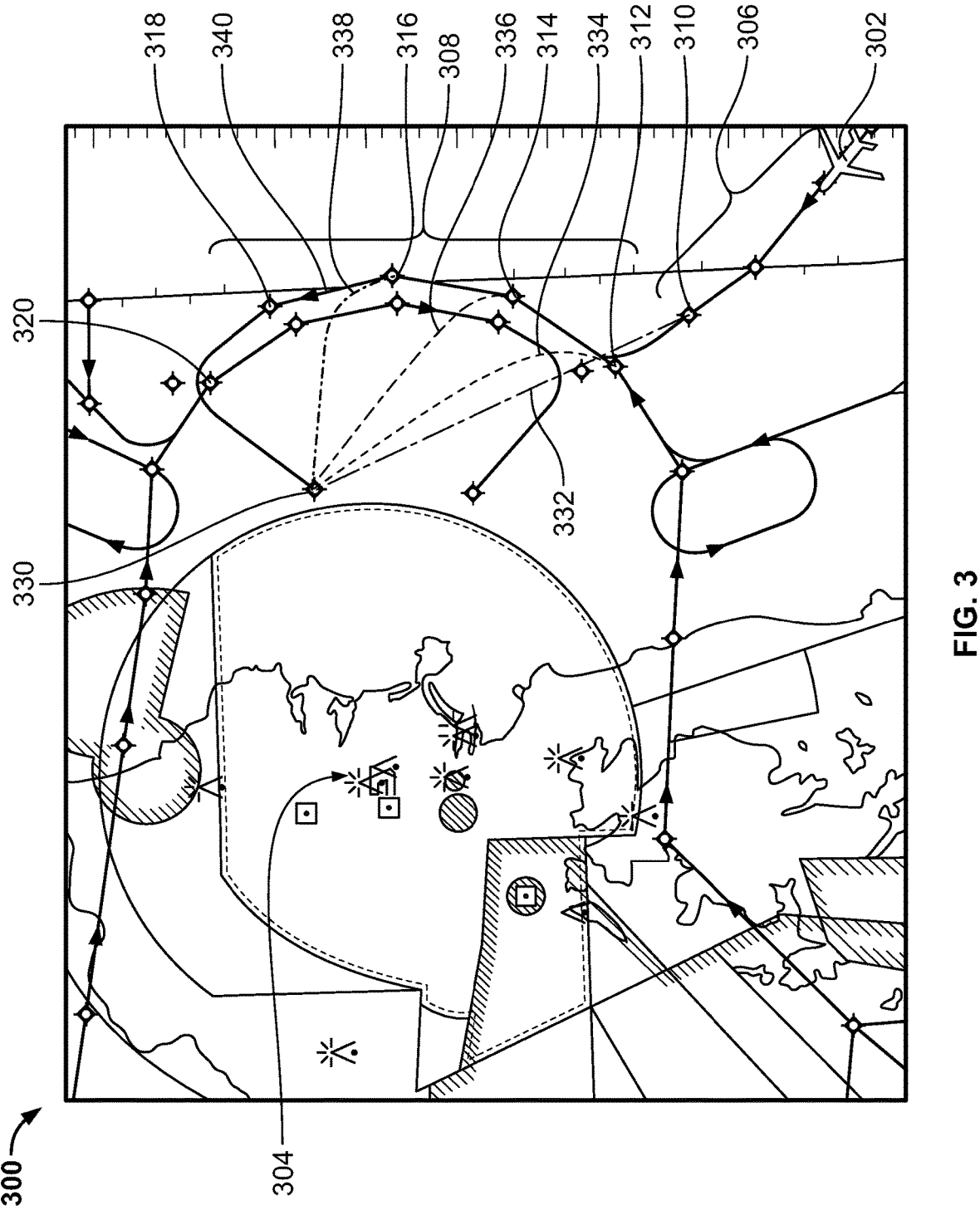
FIG. 3 depicts an exemplary navigational map suitable for presentation on graphical user interface (GUI) display in connection with one or more exemplary implementations of the conditional arrival process of FIG. 2.

FIG. 3 depicts an exemplary navigational map 300 suitable for presentation on a navigational map graphical user interface (GUI) display on a display device at an external computing system or onboard an aircraft (e.g., display device 102) to provide graphical indicia of a potential alternative lateral trajectory en route to a merge point 330 associated with a point merge procedure associated with an airport 304. The navigational map 300 includes a graphical representation of a sequencing route 308 associated with a point merge procedure within a displayed geographic region that encompasses the destination airport 304 and a current geographic location of the aircraft 120 (corresponding to the ownship aircraft symbol 302) and at least a portion of a flight plan 340 maintained by an FMS 114 or other avionics system that defines the planned lateral trajectory of the aircraft 302 en route to the merge point 330 in accordance with the point merge procedure. In this regard, the planned lateral trajectory of the aircraft 302 depicted on the navigational map 300 includes a remaining portion of an arrival route segment 306 (or phase) that terminates at a waypoint 310 that functions as the initial waypoint of the sequencing route 308 defined for arriving aircraft approaching the destination airport 304 from the south. The sequencing route 308 begins at the initial waypoint 310 and traverses a sequence of waypoints 312, 314, 316, 318, 320 that define a substantially arcuate lateral trajectory before proceeding to the merge point 330, which may be realized as the initial approach fix for an approach procedure that defines the vertical and/or lateral trajectory to be flown from the merge point 330 on approach to the desired or planned runway for landing at the destination airport 304.

Referring to FIG. 3 with reference to FIGS. 1-2, while en route to the destination airport 304, the projected profile broadcasting service at the aircraft 120 analyzes the current flight plan to identify the geographic location of the merge point 330 along with the waypoints 310, 312, 314, 316, 318, 320 defining the sequencing route 308 of the point merge procedure associated with the current flight plan. Prior to the ownship aircraft 120 traversing or reaching the initial waypoint 310 of the point merge procedure, the projected profile broadcasting service identifies the initial waypoint 310 of the point merge procedure as the next waypoint down path of the current aircraft location that is capable of functioning as a potential clearance location along the sequencing route 308 and constructs an alternative lateral trajectory 332 from the initial potential clearance waypoint 310 direct to the merge point 330 after completion of the arrival route segment 306. The projected profile broadcasting service utilizes the current geographic location of the aircraft 120, the current heading of the aircraft 120, the current speed of the aircraft 120, the current altitude of the aircraft 120, and potentially other current state information of the aircraft 120 to calculate or otherwise determine a first estimated amount of travel time required for the aircraft 120 to traverse the remaining portion of the arrival route segment 306 and arrive at the potential clearance waypoint 310, and then calculates or otherwise determines a second estimated amount of travel time required for the aircraft 120 to traverse the alternative lateral trajectory 332 and reach the merge point 330 from the potential clearance waypoint 310 based on the planned or anticipated speed, altitude, heading and/or other anticipated status information for the aircraft 120 upon reaching the potential clearance waypoint 310. The first and second estimated amounts of travel time are added to the current time to arrive at a conditional ETA for the aircraft 120 assuming a direct to clearance were issued by the ATC at or before the aircraft 120 traversing the next potential clearance waypoint 312.

As described above, the conditional ETA may be included in an EPP broadcast message transmitted by the aircraft 120 to an external computing system associated with the ATC to provide information identifying the conditional ETA for an earlier "direct to" clearance in addition to the down path route predictions for the planned trajectory traversing the entirety of the sequencing route 308 prior to proceeding direct to the merge point 330 (e.g., planned arrival times for each of the sequencing route waypoints 312, 314, 316, 318, 320). Additionally, a graphical representation of the potential alternative lateral trajectory 332 and its associated conditional ETA may be rendered or otherwise provided on the navigational map 300 depicted on a navigational map GUI display on the display device 102 onboard the aircraft 120 to provide the pilot with situational awareness of the potential alternative lateral trajectory 332 and corresponding ETA concurrently to providing a graphical representation of the flight plan 340 that traverses the entirety of the sequencing route 308 and the planned ETA for the merge point 330 in the absence of an early "direct to" clearance. In this regard, both the ATC and the pilot may be apprised of the potential range of ETAs for the aircraft 120 to facilitate negotiation of an earlier clearance or otherwise assist the ATC in sequencing different aircraft en route to the common destination airport 304.

After traversing the initial potential early clearance waypoint 310, the projected profile broadcasting service identifies the next down path waypoint 312 of the sequencing route 308 as the updated potential early clearance location and constructs an updated alternative lateral trajectory 334 from the updated potential clearance waypoint 312 direct to the merge point 330 based on the current location of the aircraft 120 along the sequencing leg defined by the respective waypoint 312. In this regard, the projected profile broadcasting service utilizes the current geographic location and other current state information for the aircraft 120 to calculate or otherwise determine a first estimated amount of travel time required for the aircraft 120 to traverse the remaining portion of the sequencing leg defined by the initial pair of waypoints 310, 312 and a second estimated amount of travel time required for the aircraft 120 to turn and proceed direct to the merge point 330 along the constructed alternative lateral trajectory 334. The next EPP message broadcast by the projected profile broadcasting service may include the updated conditional ETA associated with the updated alternative lateral trajectory 334 to update and maintain situational awareness for the ATC and the pilot with respect to the current range of potential ETAs for the aircraft 120 substantially in real-time as the aircraft 120 travels along the sequencing route 308. In this regard, as the aircraft 120 progressively traverses waypoints 310, 312, 314, 316, 318 of the sequencing route 308, the projected profile broadcasting service dynamically determines updated alternative lateral trajectories 336, 338 and dynamically updates the conditional ETAs that are transmitted or otherwise broadcast to external computing systems to reflect the current geographic location of the aircraft 120 substantially in real-time. In this manner, the ATC may be continually apprised of the range of potential options or times for when a particular aircraft 120 may be sequenced to arrive at the merge point 330.

In some implementations, the pilot, co-pilot or other operator of the aircraft 120 may utilize the graphical indicia of the conditional ETA, the next potential clearance location and/or the alternative lateral trajectory to initiate communications with ATC to attempt to negotiate a short arrival or early clearance to the merge point 330. In this regard, a pilot or other operator of an aircraft 120 generally prefers to avoid flying the entirety of the sequencing route 308 to achieve an earlier arrival and reduced fuel consumption. By concurrently providing situational awareness of the conditional ETA to the ATC, the ATC may better determine whether flying the entirety of the sequencing route 308 (or the entirety of the EPP) is necessary or desirable for purposes of managing separation and otherwise sequencing aircraft en route to the merge point 330. When the ATC determines that a short arrival or other earlier clearance is permissible or otherwise desirable, the ATC may transmit or otherwise provide a corresponding "direct to" clearance instruction to the aircraft 120 that identifies the aircraft 120 should proceed direct en route to the merge point 330. In response, the pilot or other operator of the aircraft 120 may update the flight plan or otherwise configure the FMS 114 to include the alternative lateral trajectory in the current flight in lieu of the remaining portion of the sequencing route 308, for example, by automatically removing one or more down path waypoints 312, 314, 316, 318, 320 of the sequencing route 308 from the flight plan. Thereafter, the FMS 114 may automatically operate the aircraft 120 to autonomously fly the alternative lateral trajectory direct to the merge point 330 rather than continuing along the sequencing route 308.

For the sake of brevity, conventional techniques related to aircraft procedures, avionics systems, FMSs, flight planning, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an ASIC.

The subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is logically coherent.

Furthermore, the foregoing description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. For example, two elements may be coupled to each other physically, electronically, logically, or in any other manner, through one or more additional elements. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method comprising:

identifying a first geographic location associated with a merge point for an approach to an airport associated with a flight plan for an aircraft, the flight plan including a point merge procedure en route to the airport, the point merge procedure comprising a sequencing route including a plurality of navigational reference points prior to the merge point;

determining, by a computing system onboard the aircraft, an alternative lateral trajectory for the aircraft from a second geographic location corresponding to a down path navigational reference point of the plurality of navigational reference points ahead of a current location of the aircraft along the sequencing route to the merge point;

determining, by the computing system, a conditional estimated arrival time for the aircraft reaching the merge point from the current location of the aircraft in accordance with the flight plan for a clearance prior to the second geographic location based at least in part on the alternative lateral trajectory; and broadcasting, over a communications network using an avionics system onboard the aircraft, a message including the conditional estimated arrival time for the aircraft to an external computing system, wherein a flight management system (FMS) of the aircraft automatically operates the aircraft to autonomously fly the alternative lateral trajectory to the merge point after updating the flight plan maintained at the FMS to include the alternative lateral trajectory in lieu of at least a portion of the sequencing route in response to a command to proceed directly to the merge point.

2. The method of claim 1, further comprising identifying the down path navigational reference point as a next waypoint down path of the current location of the aircraft from a plurality of waypoints defining the sequencing route as a potential clearance location along the sequencing route, wherein determining the alternative lateral trajectory comprises determining the alternative lateral trajectory from the potential clearance location to the first geographic location associated with the merge point.

3. The method of claim 1, further comprising concurrently displaying a first graphical representation of the alternative lateral trajectory and a second graphical representation of a planned lateral trajectory corresponding to the flight plan, wherein the planned lateral trajectory comprises the sequencing route.

4. The method of claim 1, further comprising, after transmitting the message including the conditional estimated arrival time:

dynamically determining an updated alternative lateral trajectory for the aircraft from a third geographic location corresponding to a next down path navigational reference point of the plurality of navigational reference points to the merge point after the aircraft traverses the down path navigational reference point;

determining an updated conditional estimated arrival time for the aircraft at the merge point based at least in part on the updated alternative lateral trajectory; and transmitting a subsequent message including the updated conditional estimated arrival time for the aircraft to the external computing system.

5. The method of claim 1, wherein broadcasting the message comprises broadcasting an Automatic Dependent Surveillance-Contract (ADS-C) broadcast message including the conditional estimated arrival time and future trajectory information determined by the FMS of the aircraft.

6. The method of claim 1, wherein determining the conditional estimated arrival time comprises:

calculating a first estimated amount of time required for the aircraft to reach the second geographic location from the current location of the aircraft in accordance with the flight plan maintained by the FMS of the aircraft;

calculating a second estimated amount of time required for the aircraft to travel along the alternative lateral trajectory and arrive at the merge point based on anticipated status information for the aircraft upon reaching the second geographic location; and determining the conditional estimated arrival time based at least in part on a current time, the first estimated amount of time and the second estimated amount of time.

7. A non-transitory computer-readable medium having computer-executable instructions stored thereon that, when executed by a processing system, cause the processing system to:

identify a first geographic location associated with a merge point for an approach to an airport associated with a flight plan for an aircraft, the flight plan including a point merge procedure en route to the airport, the point merge procedure comprising a sequencing route including a plurality of navigational reference points prior to the merge point;

determine an alternative lateral trajectory for the aircraft from a second geographic location corresponding to a down path navigational reference point of the plurality of navigational reference points ahead of a current location of the aircraft along the sequencing route to the merge point;

determine a conditional estimated arrival time for the aircraft reaching the merge point from the current location of the aircraft in accordance with the flight plan for a clearance prior to the second geographic location based at least in part on the alternative lateral trajectory; and broadcast, over a communications network using an avionics system onboard the aircraft, a message including the conditional estimated arrival time for the aircraft to an external computing system, wherein a flight management system (FMS) of the aircraft is configurable to automatically operate the aircraft to autonomously fly the alternative lateral trajectory to the merge point after updating the flight plan maintained at the FMS to include the alternative lateral trajectory in lieu of at least a portion of the sequencing route in response to a command to proceed directly to the merge point.

8. The computer-readable medium of claim 7, wherein the instructions are configurable to cause the processing system to identify a next waypoint down path of the current location of the aircraft from a plurality of waypoints defining the sequencing route as a potential clearance location along the sequencing route, wherein determining the alternative lateral trajectory comprises determining the alternative lateral trajectory from the potential clearance location to the first geographic location associated with the merge point.

9. The computer-readable medium of claim 8, wherein determining the conditional estimated arrival time comprises:

determining an estimated travel time along the alternative lateral trajectory; and determining the conditional estimated arrival time based at least in part on a current time and the estimated travel time.

10. The computer-readable medium of claim 9, wherein the instructions are configurable to cause the processing system to determine a second estimated travel time from the current location of the aircraft to the potential clearance location corresponding to the next waypoint down path of the current location in accordance with the flight plan, wherein determining the conditional estimated arrival time comprises adding the estimated travel time and the second estimated travel time to the current time.

11. The computer-readable medium of claim 7, wherein the instructions are configurable to cause the processing system to update the flight plan to include the alternative lateral trajectory in lieu of at least the portion of the sequencing route in response to receiving an early clearance for the merge point from the external computing system.

12. The computer-readable medium of claim 7, wherein the instructions are configurable to cause the processing system to concurrently display a first graphical representation of the alternative lateral trajectory and a second graphical representation of a planned lateral trajectory corresponding to the flight plan, wherein the planned lateral trajectory comprises the sequencing route.

13. The computer-readable medium of claim 7, wherein the instructions are configurable to cause the processing system to:

determine an updated alternative lateral trajectory for the aircraft from a subsequent geographic location along the sequencing route and the merge point;

determine an updated conditional estimated arrival time for the aircraft at the merge point based at least in part on the updated alternative lateral trajectory; and transmit a subsequent message including the updated conditional estimated arrival time for the aircraft to the external computing system.

14. The computer-readable medium of claim 7, wherein the external computing system comprises a monitoring system associated with an air traffic controller (ATC).

15. A system comprising:

a monitoring computing system associated with an air traffic controller (ATC) external to an aircraft;

a flight management system (FMS) to maintain a flight plan for the aircraft; and a processing system coupled to the FMS to provide a projected profile broadcasting service configurable to:

identify a first geographic location associated with a merge point for an approach to an airport associated with the flight plan for the aircraft, the flight plan including a point merge procedure en route to the airport, the point merge procedure comprising a sequencing route including a plurality of navigational reference points prior to the merge point;

determine an alternative lateral trajectory for the aircraft from a second geographic location corresponding to a down path navigational reference point of the plurality of navigational reference points ahead of a current location of the aircraft along the sequencing route to the merge point;

determine a conditional estimated arrival time for the aircraft reaching the merge point from the current location of the aircraft in accordance with the flight plan for a clearance prior to the second geographic location based at least in part on the alternative lateral trajectory; and broadcast, over a communications network using an avionics system onboard the aircraft, a message including the conditional estimated arrival time for the aircraft to the monitoring computing system, wherein the FMS is configurable to automatically operate the aircraft to autonomously fly the alternative lateral trajectory to the merge point after updating the flight plan maintained at the FMS to include the alternative lateral trajectory in lieu of at least a portion of the sequencing route in response to a command to proceed directly to the merge point.

16. The system of claim 15, wherein the projected profile broadcasting service is configurable to identify a next waypoint down path of the current location of the aircraft from a plurality of waypoints defining the sequencing route as a potential clearance location along the sequencing route, wherein determining the alternative lateral trajectory comprises determining the alternative lateral trajectory from the potential clearance location to the first geographic location associated with the merge point.

17. The system of claim 15, wherein the projected profile broadcasting service is configurable to update the flight plan at the FMS to include the alternative lateral trajectory in lieu of at least the portion of the sequencing route in response to receiving an early clearance for the merge point from the ATC.

18. The system of claim 15, wherein the projected profile broadcasting service is configurable to concurrently display a first graphical representation of the alternative lateral trajectory and a second graphical representation of a planned lateral trajectory corresponding to the flight plan, wherein the planned lateral trajectory comprises the sequencing route.

19. The system of claim 15, wherein the projected profile broadcasting service is configurable to:

determine an updated alternative lateral trajectory for the aircraft from a subsequent geographic location along the sequencing route and the merge point;

determine an updated conditional estimated arrival time for the aircraft at the merge point based at least in part on the updated alternative lateral trajectory; and transmit a subsequent message including the updated conditional estimated arrival time for the aircraft to the monitoring computing system.

* * * * *